Jan. 12, 1971  D. E. MILLER  3,554,964
STABILIZATION SYSTEMS FOR POLYMERS
Filed Oct. 19, 1967

*INVENTOR.*
DONALD E. MILLER
BY
ATTORNEY

United States Patent Office 3,554,964
Patented Jan. 12, 1971

3,554,964
STABILIZATION SYSTEMS FOR POLYMERS
Donald E. Miller, Akron, Ohio, assignor to The Goodyear Tire & Rubber Company, Akron, Ohio, a corporation of Ohio
Filed Oct. 19, 1967, Ser. No. 676,450
Int. Cl. C08f 45/58
U.S. Cl. 260—45.95         13 Claims

ABSTRACT OF THE DISCLOSURE

Phenolic/phosphite stabilizer systems for polymers containing divinyl benzene and polymers containing divinyl benzene stabilized therewith.

---

This invention relates to stabilizer blends and polymers stabilized with said blends.

Rubbery polymers such as butadiene/styrene copolymers and butadiene/acrylonitrile copolymers are known to be subject to oxidative degradation. It is known to stabilize such polymers against oxidative degradation by the addition of various nondiscoloring antioxidants, including phenolic antioxidants and phosphite antioxidants. Polymers prepared from monomer systems containing divinyl benzene (DVB) present a special stabilization problem. In addition to being subject to oxidative degradation such polymers are also subject to crosslinking on storage and during processing. This post polymerization crosslinking apparently stems from the divinyl benzene used in their manufacture. Such crosslinking is undesirable primarily from a processing standpoint, e.g., processing immediately following the manufacture of the polymer and later processing by the ultimate user of the polymer. This type of reaction differs from oxidative degradation and therefore demands special stabilization systems to aid in the protection of the polymers against this type of reaction. It is therefore desirable to provide a stabilization system which will not only aid in the prevention of this type of crosslinking, but which in addition aid in protecting this type of polymer against oxygen degradation. In some instances it is also desirable that the polymer possess a light color. It is therefore often desirable, that the stabilizers used impart little color to the polymer, be themselves relatively nondiscoloring and if possible, aid in the prevention of polymer discoloration.

It is an object of this invention to provide stabilizers which will aid in the protection of polymers prepared from monomer systems containing divinyl benzene against oxygen degradation and post polymerization crosslinking stemming from the use of divinyl benzene in their manufacture and to provide polymers so stabilized. It is a further object of this invention to provide stabilizers which will help to protect DVB polymers against both oxidative degradation and the divinyl benzene type post polymerization crosslinking and to provide polymers so stabilized. It is still another object of this invention to provide stabilizers which will help to protect DVB polymers against post polymerization crosslinking and discoloration and to provide polymers so stabilized.

The objects of this invention are accomplished by a polymer containing (A) 40 to 99.95 parts by weight of bound 1,3-butadiene monomer, (B) .05 to 5.0 parts by weight of bound divinyl benzene monomer and (C) 0 to 59.95 parts by weight of bound acrylonitrile monomer wherein the sum of (A) plus (B) plus (C) equals 100 parts by weight of polymer and having incorporated therein a stabilizing amount of (a) at least one phenolic compound selected from the group consisting of compounds conforming to the following structural formulae:

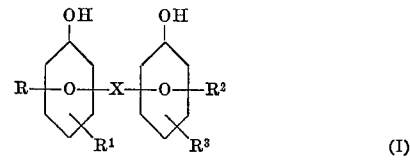

(I)

wherein R, $R^1$, $R^2$ and $R^3$ are selected from the group consisting of hydrogen, alkyl radicals containing 1 to 12 carbon atoms, cycloalkyl radicals containing 5 to 9 carbons atoms and aralkyl radicals containing 7 to 12 carbon atoms and X is selected from the group consisting of $-CH_2-O-CH_2-$, $-CH_2-S-CH_2-$ and

wherein $R^4$ and $R^5$ are selected from the group consisting of hydrogen and alkyl radicals containing 1 to 7 carbon atoms and the sum of the carbon atoms in $R^4$ plus $R^5$ is 0 to 7; and

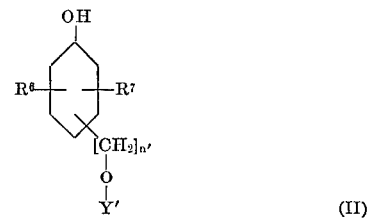

(II)

wherein $R^6$ and $R^7$ are selected from the group consisting of hydrogen, alkyl radicals containing 1 to 12 carbon atoms, cycloalkyl radicals containing 5 to 9 carbon atoms and aralkyl radicals containing 7 to 12 carbon atoms; $n'$ is an integer from 0 to 1; and $Y'$ is selected from the group consisting of hydrogen and alkyl radicals containing 1 to 2 carbon atoms, and (b) at least one phosphite compound selected from the group consisting of

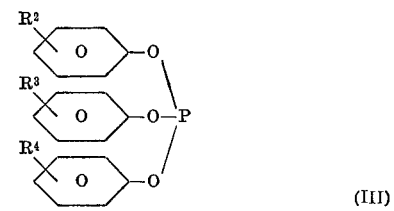

(III)

wherein $R^2$ is selected from the group consisting of alkyl radicals containing 4 to 12 carbon atoms, cycloalkyl radicals containing 5 to 9 carbon atoms and aralkyl radicals containing 7 to 12 carbon atoms and $R^3$ and $R^4$ are selected from the group consisting of hydrogen, alkyl radicals containing 4 to 12 carbon atoms, cycloalkyl radicals containing 5 to 9 carbon atoms and aralkyl radicals containing 7 to 12 carbon atoms and where the weight ratio of (a) to (b) is from 3:1 to 1:3.

Examples of phenolic compounds conforming to the above structural Formulae I and II are as follows:

2,2′-methylenebis(4-methylphenol)
4,4′-isopropylidene bis phenol
α,α′-di(2-hydroxy-5-methylphenyl)dimethylether
α,α′-di(2-hydroxy-5-methylphenyl)dimethyl sulfide
4-methylol phenol
2-methylol-4-methylphenol
4-β-hydroxyethylphenol
2-methoxymethyl-4-methylphenol
4-β-methoxyethylphenol
2,2′-methylene bis(3-α-phenylethyl-5-methylphenol)

4,4'-isopropylidene bis(2-dimethylbenzylphenol)
α,α'-di(2-hydroxy-3-cyclohexyl-5-methylphenyl) dimethylether
α,α'-di(2-hydroxy-3-α-tolylethyl-5-methylphenyl) dimethyl sulfide
2-α-phenylethyl-4-methylol phenol
2-methylol-4-methyl-6-dimethylbenzylphenol
2-cyclohexyl-4-β-hydroxyethylphenol
2-methoxymethyl-4-methyl-6-α-p-tolylethylphenol
2,2'-methylene bis(2,4-dimethylphenol)
α,α' di(2-hydroxy-3-butyl-5-methylphenyl)dimethylether
α,α' di(2-hydroxy-3,5-dimethylphenyl)dimethyl sulfide
2-methyl-4-methylolphenol
2-ethyl-4-β-hydroxyethylphenol
2-cyclohexyl-4-methylolphenol
2,2'-methylene bis(6 tert.butyl-4-methylphenol)
4,4'-methylene bis(2,6-ditert.butylphenol)
4,4'-isopropylidene bis(2-tert.hexylphenol)
α,α'-di(2-hydroxy-3-butyl-5-tert.amylphenyl)dimethylether
α,α'-di(2-hydroxy-3-tert.hexyl-5-methylphenyl)dimethyl sulfide
2-tert.octyl-4-methylolphenol
2-methylol-4-methyl-6-tert.butylphenol
2,6-ditert.butyl-4-β-hydroxyethylphenol
2-methylcyclohexyl-4-methylol-6-tert.hexylphenol
2-methyl hydroquinone
tert.butyl catechol
tert.butyl resorcinol
ditert.butyl catechol
ditert.amyl resorcinol
2-tert.hexyl hydroquinone
2-α-phenylethyl hydroquinone
2-methylcyclohexyl hydroquinone
2,5-ditert.butyl hydroquinone
2,5-ditert.amyl hydroquinone
2,5-ditert.hexyl hydroquinone
2,5-di(α-phenylethyl)hydroquinone
2,5-di(dimethylbenzyl)hydroquinone,
2-tert.butyl-5-tert.octyl hydroquinone
2-tert.butyl-5-α-phenylethyl hydroquinone Examples of phosphites which can be used in the practice of the present invention are as follows:

tris(p-hexylphenyl) phosphite
tris(nonylphenyl) phosphite
tris(amylphenyl) phosphite
tris(cyclohexylphenyl) phosphite
tris(cyclopentylphenyl) phosphite
tris(methylcyclohexylphenyl) phosphite
tris(α-phenylethylphenyl) phosphite
tris(p-benzylphenyl) phosphite
tris(dimethylbenzylphenyl) phosphite
di(nonylphenyl) cyclohexylphenyl phosphite
nonylphenyl-di(α-phenylethylphenyl) phosphite
nonylphenyl, cyclohexylphenyl, benzylphenyl phosphite Preferred phenolic compounds are those conforming to structural Formula I herein wherein X is selected from the group consisting of —CH₂—O—CH₂— and —CH₂—, particularly —CH₂—, and those conforming to structural Formula II wherein R⁶ and R⁷ are selected from the group consisting of hydrogen, alkyl radicals containing 1 to 7 carbon atoms and cycloalkyl radicals containing 6 to 7 carbon atoms; particularly those wherein $n'$ is 1 and Y is hydrogen.

Polymers offered particularly effective protection in the practice of the present invention are polymers containing (A) 55 to 84.9 parts by weight of bound 1,3-butadiene monomer, (B) 0.10 to 2.5 parts by weight of bound divinyl benzene and (C) 15 to 44.9 parts by weight of bound acrylonitrile monomer wherein the sum of (A) plus (B) plus (C) equals 100 parts by weight of polymer.

The polymers stabilized by the practice of the present invention can be made by well known emulsion polymerization techniques involving the emulsion polymerization of monomer systems comprising 1,3-butadiene, acrylonitrile and divinyl benzene. For example, the polymers may be prepared according to the disclosure at column 3, lines 16 to 35 of U.S. Pat. No. 2,927,093.

Examples of polymers that can be stabilized by the practice of the present invention are:

75/24/1 butadiene/acrylonitrile/DVB
75/24.5/0.5 butadiene acrylonitrile/DVB
70/29.5/0.5 butadiene/acrylonitrile/DVB
60/39.8/0.2 butadiene/acrylonitrile/DVB
50/49.5/0.5 butadiene/acrylonitrile/DVB
80/15/5 butadiene/acrylonitrile/DVB
90/9.5/0.5 butadiene/acrylonitrile/DVB
40/59.5/0.5 butadiene/acrylonitrile/DVB The stabilizers of the present invention can be incorporated into the polymers of the present invention by any of the conventional methods such as by open mill mixing, Banbury mixing and the addition of solutions, emulsions, suspensions or dispersions of the stabilizers to solutions, emulsions, suspensions or disperions of the polymers. The method of incorporation is not critical. If the compound is water soluble it is preferred that it not be added to an aqueous latex. Also, it can be preferable to add the stabilizer to the latex if the polymer is made by emulsion polymerization rather than delaying addition until after coagulation and drying, particularly where these processing steps are severe, so as to prevent degradation during processing.

Polymers of the present invention may be effectively stabilized by the addition of 0.10 to 7.0 parts by weight per 100 parts by weight of the polymers of the phenol/phosphite combination of the present invention, although from 0.50 part to 5.0 parts by weight per 100 parts by weight of polymer is normally adequate, while a preferred range is from 0.50 part to 3.0 parts by weight per 100 parts by weight of polymer. The phenol and phosphite can be added to the polymer separate or together and in any order.

The phenolic compounds used in the practice of the present invention can be prepared by various methods well known in the art. For example, methylene bis phenols can be prepared as described in U.S. Pat. No. 2,538,355 (Example 5). Bis phenols containing a

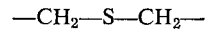
—CH₂—S—CH₂— linkage can be prepared as described in U.S. Pat. No. 3,272,869. Bis phenols containing an —O— linkage can be prepared as described in Burchalter et al., Journal of the American Chemical Society, 68, 1896 (1946). Methylol substituted phenols and bis phenols containing a —CH₂—O—CH₂— linkage can be prepared as disclosed in Walker, "Formaldehyde," ACS Monograph Series, Reinhold Publishing Corporation, 310–314 (1964). α,α'-Dihydroxy xylene type compounds can be prepared as described in U.S. Pat. No. 2,666,786. Alkylated mononuclear dihydroxy compounds may be prepared as described in British Pat. No. 596,461. Phenols containing a methylol substituent can be prepared as described in U.S. Pat. No. 3,030,428. Phenols containing a —CH₂—O—CH₂— radical can be prepared as described in U.S. Pat. No. 2,954,345.

Various substituents such as alkyl, cycloalkyl and aralkyl radicals may be attached to the phenolic nucleus by many well known methods. For example, an alkyl radical may be attached to the phenolic nucleus by reacting a phenol with an olefin in the presence of a Friedel-Crafts catalyst. It is not intended to limit the scope of the present invention by the method of preparation of the phenolic compounds since the methods of making the compounds is not critical to the practice of the present invention.

The phosphite compounds used in the practice of the present invention can be prepared by various methods well known in the art, for example, as described in U.S. Pat. No. 2,733,226 and U.S. Pat. No. 3,244,661. It is not intended to limit the scope of the present invention by the method of preparation of the phosphite compounds since the methods of making the compounds is not critical to the practice of the present invention.

The following examples are representative but not restrictive of the practice of the present invention.

The data and observations are listed in the following Table I. Experiments A, B, C, D, E, F and G were run using systems not within the scope of the present invention. Experiments H and I were run using systems within the scope of the present invention.

TABLE I

| Exp.[1] | Stabilizer system | Parts | Original color[2] | Masticated condition | Mooney[3] rise (ΔML-4) | Brabender[4] curve shape |
|---|---|---|---|---|---|---|
| A | 2,6-ditert.butyl-4-methyl phenol | 2.0 | Off white | Crumbled | +83 | PH |
| B | ([5]) | 2.0 | Darker | do | +104 | PH |
| C | 2,2'-methylenebis [4-methyl-6-(α-methyl-cyclohexyl) phenol] | 2.0 | Pink | Massed | +37 | NH |
| D | 2,5-ditert-amyl hydroquinone | 2.0 | Very slightly darker | Semi-massed | +48 | NH |
| E | do | 1.0 | Equal | Massed | +19 | NH |
| F | 2,5-ditert-amyl hydroquinone and ([5]) | 1.0/1.0 | Slightly darker | do | +28 | NH |
| G | ([5]) and tris (nonylphenyl) phosphite [Polygard] | 1.0/1.5 | Equal | Crumbled | +78 | PH-RH |
| H | 2,5-ditert.amyl hydroquinone and tris(nonylphenyl) phosphite | 1.0/1.0 | do | Massed | −1 | NH |
| I | 2,5-ditert.amyl hydroquinone, tris (nonylphenyl) phosphite and ([5]) | 0.67/0.67/0.67 | Very slightly darker | do | +5 | NH |

[1] Experiment.
[2] Color comparisons are based upon the original color of the polymer of Experiment A.
[3] Original ML-4 (212° F.) of about 100. Mooney Rise is the post mastication Mooney minus the original Mooney.
[4] PH, Pronounced hump; RH, reduced hump or delayed hump; NH, no hump.
[5] A two stage phenolic reaction product. The first stage involved a reaction mixture of 3 mols of p-cresol and 1 mol of dicyclopentadiene. It was run at a temperature of approximately 180 to 185° F. using a boron trifluoride catalyst. The second stage involved a reaction mixture of approximately 3 parts by weight of the stripped first stage reaction product and about 1 part by weight of isobutylene using toluene sulfonic acid as the catalyst and toluene as the solvent at approximately 180 to 185° F.

EXAMPLE 1

A butadiene/acrylonitrile/DVB polymer latex having a bound monomer ratio of approximately 70/30/0.25 was prepared by emulsion polymerization. The polymer possessed an ML-4/212° F. of 111. Various compounds were added to the latex as follows. Those of the phenolic compounds capable of ready emulsification were emulsified. Those compounds which were not readily emulsifiable were dissolved in a solvent and the solution emulsified. The emulsions were added to the butadiene/acrylonitrile/DVB latex under agition. The resulting latex was coagulated using magnesium sulfate and the polymer crumb washed with water and dried.

The color of the dried polymer was observed and recorded. After preparation 58 gram portions of each of the polymers containing the stabilizers were subjected to a hot mastication for 60 minutes at 170° C. in a Brabender Corporation Plastograph (Model PL-750)[1] at a rotor speed of 50 r.p.m. The Plastograph torque was recorded versus time during the mastication and the conditions of the masticated polymer, after complete mastication, observed and recorded. Mooney viscosities (ML-4/212° F.) measurements were made before and after mastication.

The figure depicts a torque curve which is representative of the behavior of a polymer used within the practice of the present invention when masticated in a Brabender Plastograph without adequate stabilization against post polymerization DVB type crosslinking. It is theorized that the hump in the curve results from post polymerization DVB crosslinking, since the polymers which do not exhibit post polymerization crosslinking do not exhibit such a hump. Materials that are considered particularly effective as aids in preventing post polymerization DVB crosslinking are those which either completely remove the hump in the torque curve or appreciably diminish it or delay its formation.

Mooney viscosity rise during mastication and the masticated condition of the polymer are considered to be some measure of degradation to the polymer. A high Mooney rise indicates greater degradation. A masticated polymer in a crumbled condition indicates degradation while a polymer in a massed or semi-massed condition indicates lack of degradation or reduced degradation.

As shown by the above data a polymer stabilized with a phenolic compound not within the practice of the present invention (Experiment A) had a pronounced hump in its Brabender curve indicating the post polymerization crosslinking effect and was in a crumbled condition after mastication, thus indicating degradation. The Mooney Rise was also quite large, +83, also indicating degradation.

The polymer of Experiment B containing a good long term phenolic stabilizer also performed very poorly.

Experiment C involved the use of a bis phenol and resulted in no torque hump, a good masticated condition and a lower Mooney rise than the polymers of Experiments A and B.

Experiments D and E involved the use of 2,5-ditert.-amylhydroquinone at different levels. Both polymers produced no torque hump on mastication and degraded much less than the polymers of Experiments A and B as evidenced by the improved masticated condition of the polymers and the lower Mooney Rises. In Experiment F the phenolic compound of Experiments D and E was combined with the phenolic compound of Experiment B. As the data demonstrate, the phenolic compound of Experiment B had little effect upon the performance of the phenolic compound of Experiments C and D. In Experiment G the phenolic compound of Experiment B was combined with a well known phosphite stabilizer. As the data indicate, the polymer still possessed poor masticated properties, indicating that neither component offered much protection to polymers.

In Experiment G the phenolic stabilizer of Experiments D and E was combined with the same phosphite stabilizer. As the data demonstrate, this combination resulted in a polymer possessing no hump in its Brabender curve, a good masticated condition, no Mooney Rise and good original color, although neither of the components when not used in combination were capable of preventing a Mooney Rise.

Although certain phenolic compounds containing more than one hydroxy group (e.g., Experiments C, D and E) remove the torque hump and improve resistance to degradation, it has been discovered that certain phosphite compounds, which are known to be particularly nondiscoloring, not only may be used to permit light polymer color without sacrificing crosslinking and other degradation protection but may be used, in fact, to enhance such protection when used with such phenolic compounds. Therefore, improved polymers possessing a light original color and improved resistance to degradation, such as crosslinking, may be obtained using the stabilizing systems of the present invention.

---
[1] Equipped with a Banbury style mixing head.

Since it is desirable that such polymers possess good long term and post vulcanization stability the phenolic compound of Experiment B, which is known to provide good long term and post vulcanization stabilization, was added to the phenolic/phosphite combination of Experiment H (Experiment I). As shown by the data, the combination provided a polymer with a good masticated condition, allowed no hump formation in the Brabender curve and permitted essentially no rise in Mooney.

Other stabilizers quite effective as post vulcanization stabilizers which may be used as a third component are two stage reaction products where in the first stage a mixture of one more of the following: phenol, p-cresol, mixed m-p-cresol and p-ethyl phenol; and dicyclopentadiene is reacted at a temperature of about 25 to 160° C. using a Friedel-Crafts type catalyst. One mole of the dicyclopentadiene is used with at least one mol of the phenolic material. In the second stage the first stage reaction product is reacted in the presence of an acidic alkylation catalyst with at least one-half mol of isobutylene.

The stabilizer systems of the present invention as described earlier herein will perform in the polymers of the present invention as described earlier herein in essentially the same manner as the stabilizer systems used in Experiments H and I described above.

The present invention provides butadiene/acrylonitrile/DVB polymers with good original color and increased stability against post polymerization crosslinking and oxygen degradation.

While certain representative embodiments and details have been shown for the purpose of illustrating the invention, it will be apparent to those skilled in this art that various changes and modifications may be made without departing from the spirit or scope of the invention.

What I claim is:

1. A polymer containing (A) 40 to 99.95 parts by weight of bound 1,3-butadiene monomer, (B) .05 to 5.0 parts by weight of bound divinyl benzene monomer and (C) 0 to 59.95 parts by weight of bound acrylonitrile monomer wherein the sum of (A) plus (B) plus (C) equals 100 parts by weight of polymer and having incorporated therein a stabilizing amount of a composition comprising (a) at least one phenolic compound selected from the group consisting of compounds conforming to the following structural formula

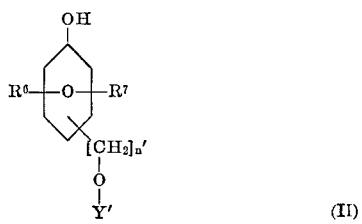

wherein $R^6$ and $R^7$ are selected from the group consisting of hydrogen, alkyl radicals containing 1 to 12 carbon atoms, cycloalkyl radicals containing 5 to 9 carbon atoms and aralkyl radicals containing 7 to 12 carbon atoms; $n'$ is an integer from 0 to 1; and $Y'$ is selected from the group consisting of hydrogen and alkyl radicals containing 1 to 2 carbon atoms, and (b) at least one phosphite compound selected from the group consisting of compounds conforming to the following structural formula

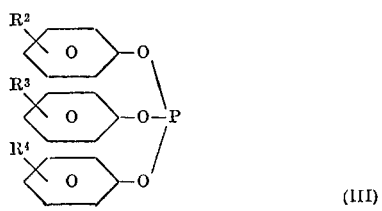

wherein $R^2$ is selected from the group consisting of alkyl radicals containing 4 to 12 carbon atoms, cycloalkyl radicals containing 5 to 9 carbon atoms and aralkyl radicals containing 7 to 12 carbon atoms and $R^3$ and $R^4$ are selected from the group consisting of hydrogen, alkyl radicals containing 4 to 12 carbon atoms, cycloalkyl radicals containing 5 to 9 carbon atoms and aralkyl radicals containing 7 to 12 carbon atoms and where the weight ratio of (a) to (b) is from 3:1 to 1:3.

2. A polymer according to claim 1 wherein the phenolic compound is a compound conforming to structural Formula I.

3. A polymer according to claim 2 wherein X is selected from the group consisting of —CH$_2$—O—CH$_2$— and —CH$_2$—.

4. A polymer according to claim 2 wherein X is

—CH$_2$—

5. A polymer according to claim 2 wherein in structural Formula III, $R^2$, $R^3$ and $R^4$ are alkyl radicals containing 4 to 12 carbon atoms.

6. A polymer according to claim 2 wherein in structural Formula III, $R^2$, $R^3$ and $R^4$ are aralkyl radicals containing 7 to 12 carbon atoms.

7. A polymer according to claim 1 wherein $R^6$ and $R^7$ are selected from the group consisting of hydrogen, alkyl radicals containing 1 to 7 carbon atoms and cycloalkyl radicals containing 6 to 7 carbon atoms.

8. A polymer according to claim 7 wherein $n'$ is 1 and Y is hydrogen.

9. A polymer according to claim 1 wherein in structural Formula III, $R^2$, $R^3$ and $R^4$ are alkyl radicals containing 4 to 12 carbon atoms.

10. A polymer according to claim 1 wherein in structural Formula III, $R^2$, $R^3$ and $R^4$ are aralkyl radicals containing 7 to 12 carbon atoms.

11. The polymer according to claim 1 wherein the polymer contains (A) 55 to 84.9 parts by weight of bound 1,3-butadiene monomer, (B) 0.10 to 2.5 parts by weight of bound divinyl benzene and (C) 15 to 44.9 parts by weight of bound acrylonitrile monomer.

12. The polymer according to claim 7 wherein $n'$ is 0 and $Y'$ is hydrogen.

13. A polymer containing (A) 40 to 99.95 parts by weight of bound 1,3-butadiene monomer, (B) .05 to 5.0 parts by weight of bound divinyl benzene monomer and (C) 0 to 59.95 parts by weight of bound acrylonitrile monomer wherein the sum of (A) plus (B) plus (C) equals 100 parts by weight of polymer and having incorporated therein a stabilizing amount of a composition comprising 2,5-ditert.amyl hydroquinone and a a tris-(nonylphenyl) phosphite.

References Cited
UNITED STATES PATENTS

| | | | |
|---|---|---|---|
| 3,039,993 | 6/1962 | Friedman | 260—45.7 |
| 3,274,258 | 9/1966 | Odenwellen | 260—45.95 |
| 3,352,820 | 11/1967 | Bawn | 260—45.95 |
| 3,355,421 | 11/1967 | Cook | 260—45.95 |

HOSEA E. TAYLOR, Primary Examiner

U.S. Cl. X.R.

260—45.7